United States Patent [19]

Carlsson et al.

[11] 4,264,079
[45] Apr. 28, 1981

[54] ASSEMBLY FOR THE TRANSFER OF A FLUID BETWEEN A DUCT AND A SPACE BETWEEN TWO THIN SHEETS

[75] Inventors: Per-Olov A. V. Carlsson, Sosdala; Kaj O. Stenberg, Staffanstorp, both of Sweden

[73] Assignee: Gambro AB, Sweden

[21] Appl. No.: 961,634

[22] Filed: Nov. 17, 1978

[30] Foreign Application Priority Data

Nov. 18, 1977 [SE] Sweden ............................ 7713021

[51] Int. Cl.³ .................. B01D 31/00; F16L 5/02; A61M 1/03
[52] U.S. Cl. ........................... 277/166; 210/222.1; 210/321.1; 285/200
[58] Field of Search .............. 285/200; 210/321 R, 210/221 R; 277/166

[56] References Cited

U.S. PATENT DOCUMENTS

| Re. 27,510 | 10/1972 | Hoeltzenbein . | |
|---|---|---|---|
| 1,809,413 | 6/1931 | Hirshstein | 285/200 |
| 2,028,861 | 1/1936 | Bieth | 285/200 |
| 3,709,367 | 1/1973 | Martinez . | |
| 3,712,474 | 1/1973 | Martinez . | |
| 3,880,760 | 4/1975 | Flandoli . | |
| 3,962,095 | 6/1976 | Luppi . | |
| 3,963,621 | 6/1976 | Newman . | |
| 4,059,530 | 11/1977 | Luppi . | |

FOREIGN PATENT DOCUMENTS 1417446  12/1975  United Kingdom .
1433512  4/1976  United Kingdom .

*Primary Examiner*—Robert I. Smith
*Attorney, Agent, or Firm*—Lerner, David, Littenberg & Samuel

[57] ABSTRACT

Assembly is disclosed for connecting a duct to a hole in a flat sheet including a wall for receiving one surface of the flat sheet, a nozzle adapted to be sealingly connected to a duct, the nozzle protruding through and beyond the wall such that the flat sheet is arranged with said one surface in engagement with the wall and the nozzle, and a sealing collar engaged with the other surface of the flat sheet, said collar being adapted to cooperate with the wall to seal the flat sheet therebetween.

15 Claims, 2 Drawing Figures

ASSEMBLY FOR THE TRANSFER OF A FLUID BETWEEN A DUCT AND A SPACE BETWEEN TWO THIN SHEETS

BACKGROUND OF THE INVENTION

The present invention relates to assembly for the transfer of a fluid between a duct and a space between two thin sheets, i.e., for feeding of a fluid into or removal of a fluid from this space. More particularly, the present invention is related to means for creating a fluid tight seal in such apparatus.

A number of apparatuses for transferring a fluid between a duct and the space between two thin sheets are known. For example, U.S. Pat. No. Re 27,510 discloses a device in which the ends of a tubular membrane are folded around a highly elastic terminal tube 9 and pulled together under strong friction so as to be leak-proof. The patentee thus employs a conical bore 8 of a confining rim 10 in the outer casing 13 as best shown in FIG. 4 of the patent.

U.S. Pat. No. 3,712,474 teaches another such device which includes connector units 52 and 54 as best shown by FIG. 6 of the patent. In each unit, patentee includes a substantially resilient body portion 60 in a relatively less flexible cup element 62. By closely conforming the internal cup dimension to that of the body and by forming the body of a substantially resilient material, a snug fit is provided. Moreover, at least one O-ring 72 supported by the body insures a better fluid tight seal and prevents a possibility that the membrane will pull loose. Similar teachings are contained in U.S. Pat. Nos. 3,709,367 and 3,743,098.

U.S. Pat. No. 3,880,760 discloses yet another such device which includes a core cover section 2 adapted to mate with a core base section 1 with the ends of the tubular membrane therebetween. A similar structure is employed at the other end of the tubular membrane as shown by FIG. 2 of the patent. The core cover and core base sections are provided with seals 5 and 6 to seal the membrane tube 9 with the open end 7 of the blood inlet conduit within the membrane tube.

In a similar vein is U.S. Pat. No. 3,962,095 which discloses blood inlet and outlet means 26 for connection with arterial and veinous lines attached to a casing 22 using wedge section cover plates 28 which carry a seal 32. The cover plates 28 are secured to the casing by means of screws 30, the seal 32 sealing the free ends of the membrane tube 12 with the blood inlet and blood outlet means 26.

U.S. Pat. No. 4,059,530 discloses blood inlet and outlet ports in a dialyzer membrane 3 comprising a connector 30 connected to a header 32. The header 32 is located internally in the tubular membrane. A locking disc 33 locks the membrane 3 against one wall of the header 32. The header is provided with internal chambers 35 communicating with the interior of the tubular membrane 3.

Other similar devices are shown in U.S. Pat. No. 3,963,621, British Pat. No. 1,417,446 and British Pat. No. 1,433,512. U.S. Pat. No. 3,963,621 merely states that a tube 18 communicates conventionally with the end 20 of a membrane 16. FIG. 3 of British Pat. No. 1,433,512 shows a membrane tube 2 pleated around a rigid connecting plug 38. Medical plaster 41 is applied around the membrane tube and the tube is secured by means of two knotted cords 42 and 43 in the annular grooves 39 and 40 of the plug. British Pat. No. 1,417,446 merely discloses that the core 1 includes an opening in which a sleeve 31 fits so that the blood tube 12 can be connected to the membrane tube 2.

While some of these known constructions operate in a relatively satisfactory manner, each is still subject to certain disadvantages. Among other things, certain of these constructions contain a large number of parts rendering assembly more difficult and producing a number of sealing problems. It is thus an object of the present invention to provide a construction which is simple to manufacture and assemble and which produces a fluid tight seal.

SUMMARY OF THE INVENTION

In accordance with the present invention, an assembly for sealingly connecting a duct to a hole in a flat sheet has been devised including a wall for receiving one surface of the said flat sheet, a nozzle adapted to be sealingly connected to a duct, said nozzle protruding through and beyond said wall so that the said flat sheet can be arranged with its said one surface in engagement with said wall and the said nozzle protruding through the hole in said flat sheet, and a sealing collar engaged with the other surface of said flat sheet, said collar being adapted to cooperate with said wall to seal said flat sheet therebetween. The wall, nozzle and duct are preferably monolithically formed.

In a preferred embodiment of the present invention, a second flat sheet is disposed above the nozzle and collar so as to allow fluid flow between the duct and the space between the two flat sheets. The two flat sheets preferably define a compressed tube.

In another preferred embodiment, the above-mentioned wall defines an annular groove adjacent to and surrounding said nozzle. The nozzle, groove and collar are preferably circular in shape.

In yet another preferred embodiment of the present invention, an annular bead is provided in the annular groove. The nozzle is placed through a hole in one of the thin sheets. The collar in a form of a flat ring is placed over said one of the thin sheets and around the nozzle, said ring sealing said flat sheet between the bead and the ring.

In the most preferred embodiment of the present invention, the nozzle includes a lip on the outer surface of the nozzle, which lip cooperates with the collar to hold the collar in place so as to seal the flat tube between the wall and the collar. Preferably, the collar is held in an oblique position with respect to the top surface of the nozzle and is pressed against an annular bead in a groove surrounding and adjacent to the nozzle so as to create a fluid tight seal by sandwiching said one of the thin sheets between the annular bead and the collar. The second of the thin sheets is placed above the nozzle and collar. The two thin sheets may, of course, consist of two separate sheets or they may be molded into one piece, e.g., a compressed tube such as a dialysis membrane tube.

The assembly of the present invention has been found to be very useful in a dialysis arrangement such as that shown in copending U.S. application No. 902,353 filed May 3, 1978, the disclosure of which is incorporated herein by reference. More particularly, the assembly of the present invention is intended to replace the parts shown in FIGS. 12, 13 and 14 of the above-mentioned application. However, it will also be clear to those skilled in this art that devices of this type may be used for other diffusion and/or filtration processes, such as use with oxygenators. Thus, the term "fluid" is intended to cover gases as well as liquids.

BRIEF DESCRIPTION OF THE DRAWINGS

The present invention may be better understood with reference to the Figures which are described as follows.

DETAILED DESCRIPTION

The present invention may be described in greater detail with reference to the Figures shown in the preferred embodiments of the invention, in which like numerals refer to like portions thereof.

Figure 1:
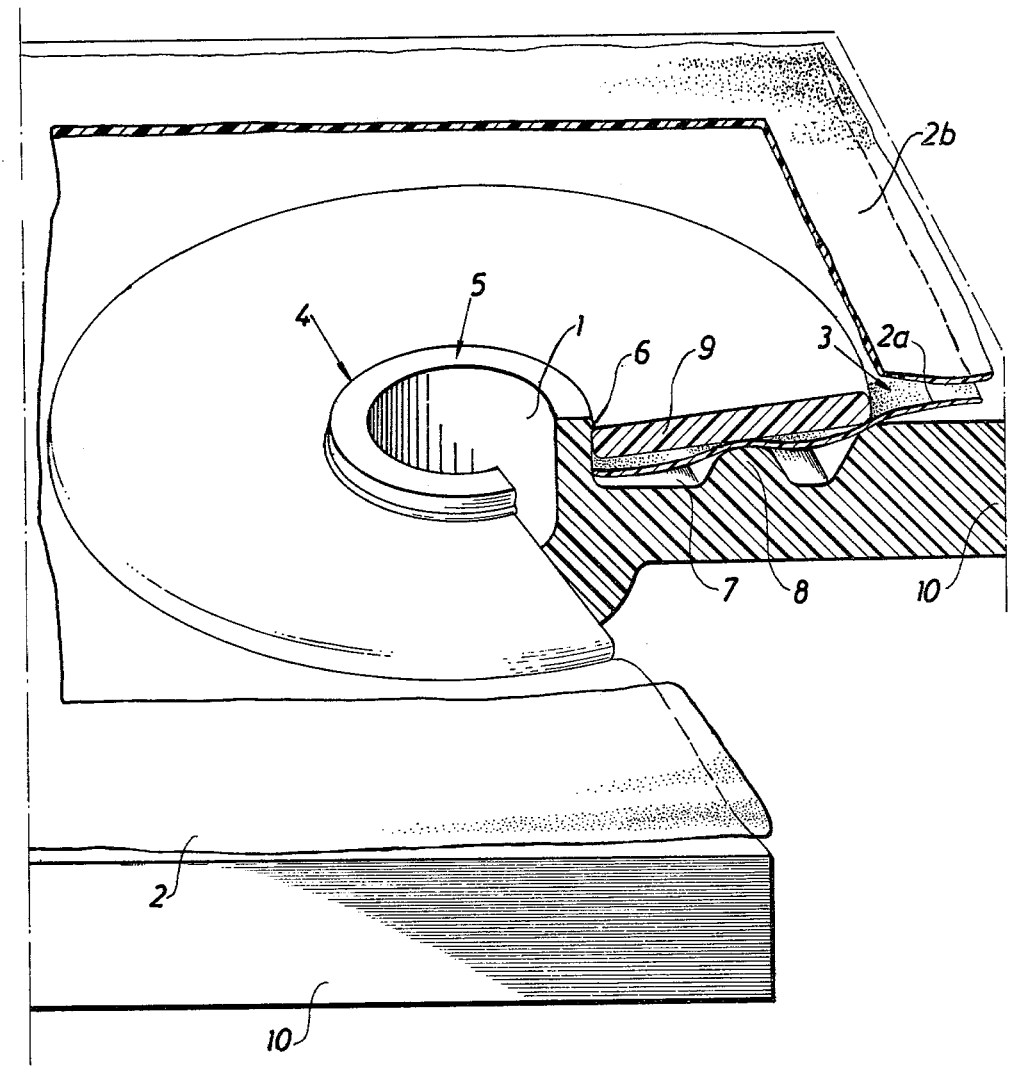
FIG. 1 is a perspective view of an apparatus in accordance with the present invention, a portion of the apparatus being broken away to show a partial cross-sectional view.

Referring to FIG. 1, an apparatus in accordance with the present invention is shown in which a duct 1 terminates in a nozzle 4. The nozzle is provided with a plane top surface 5 and a radially projecting annular bead or lip 6. The nozzle 4 is surrounded by an annular groove 7 in the wall member 10, the base of which groove is provided with an annular sealing bead 8. The nozzle 4 is placed in a hole in an inner sheet part 2a of a sheet tube 2. The inner sheet part 2a is held firmly in place against the bead 8 by a ring 9, which ring is held in place between the lip 6 and the bead 8 so that the surface of the ring is in an oblique position relative to top surface 5 of the nozzle. The outer sheet part 2b lays flat against the apparatus above the top surface 5 so as to create a space between the sheet parts 2a and 2b indicated by the numeral 3. This arrangement thus allows for the transfer of a liquid or other fluid between the duct 1 and the space 3, i.e., to or from the space 3. In practice, the flattened tube 2 is preferably much wider than appears from this figure.

Figure 2:
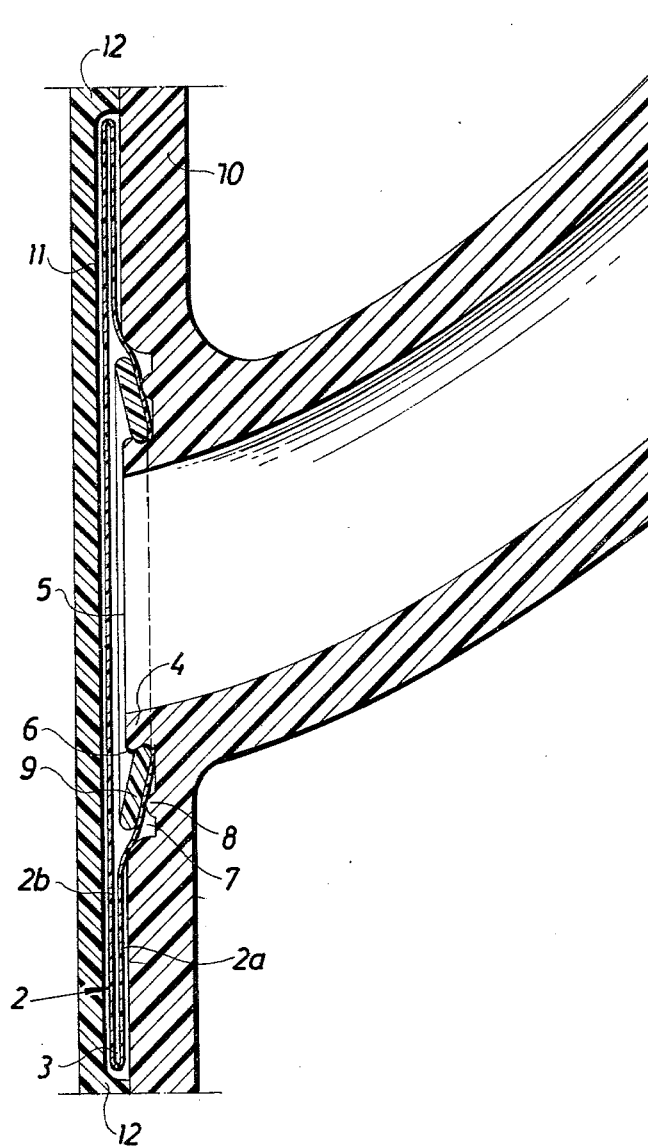
FIG. 2 is a longitudinal cross-sectional view of another embodiment of the present invention.

Referring to FIG. 2, another embodiment of the present invention is shown in which the relative sizes of the component parts have been varied and in which additional parts of the apparatus have been shown. Thus, FIG. 2 shows that the tube 2 is arranged between a duct 1 arranged in a wall member 10 and a clamping bar 11 or the like. The wall member 10 and the clamping bar 11 are held at a distance from one another by spacers 12 or the like so that a liquid or other fluid can flow freely between the space 3 inside the tube 2 and the duct 1.

It will be understood that the embodiments described above are merely exemplary and that persons skilled in the art may make many variations and modifications without departing from the spirit and scope of the invention. For example, it will be obvious to those skilled in the art that the tube 2 can be substituted by two separate sheets placed flat against one another which are held tightly clamped together along their edges with the help of wall member 10, clamping rail 11 and spacers 12. It is, of course, also immaterial what form the tube has in other respects. It may, for example, be laid completely flat or it may be wound in a form of a spiral. The construction of the apparatus as shown herein may thus constitute either the inner or outer end of the tube. All such modifications and variations are intended to be included within the scope of the invention as defined by the appended claims.

What is claimed is:

1. An assembly for fluidically connecting a duct to a hole in a flat sheet, comprising
   a duct for passage of a fluid therethrough,
   a wall having a wall hole therethrough, said wall hole being fluidically connected to said duct,
   a nozzle fluidically connected to said wall hole,
   an annular sealing ring adapted to snap-fit about said nozzle, to provide fluid communication between said hole in said flat sheet and said duct, and to sealingly engage the flat sheet about said sheet hole when said annular sealing ring is in its sealing position,
   snap fit means disposed about said nozzle and adapted to cooperate with said annular sealing ring to hold it in its said sealing position, said snap fit means comprising first preventing means on said nozzle for preventing axial movement of said sealing ring in a first axial direction with respect to said nozzle when said sealing ring is in its sealing position about said nozzle, and second preventing means on said wall for preventing axial movement of said sealing ring in a second axial direction generally opposite said first axial direction when said sealing ring in its sealing position about said nozzle,
   wherein, when said annular sealing ring is in its snap-fitted sealing position about said nozzle,
   (a) said nozzle protrudes through said hole in said flat sheet,
   (b) the area of said flat sheet surrounding said nozzle is disposed substantially flat between said annular sealing ring and said second preventing means on said wall, and
   (c) said annular sealing ring cooperates with said first and second preventing means to seal said flat sheet between said annular sealing ring and said second preventing means.

2. An assembly according to claim 1 in which a second flat sheet is disposed above said nozzle and said ring so as to allow fluid flow between said duct and the space between said flat sheet and said second flat sheet.

3. An assembly according to claim 2 in which said flat sheet and said second flat sheet define two walls of a compressed tube.

4. An assembly according to claim 1 wherein said ring is a flat annular ring.

5. An assembly according to claim 2, wherein said annular sealing ring is disposed between said flat sheet and said second flat sheet such that it can be snapped into position about said nozzle by applying a force to said sealing ring through said second flat sheet.

6. An assembly according to claim 2 or 1, in which said second preventing means comprises a groove in said wall adjacent to and surrounding said nozzle, wherein said flat sheet is sealingly held against the outer edge of said groove between said outer edge of said groove and said annular sealing ring when said sealing ring is in its sealing position.

7. An assembly according to claim 6, in which said groove includes a bead in the base of said groove, against which bead said flat sheet is sealingly held by said annular sealing ring when said ring is in its sealing position.

8. An assembly according to claim 7 wherein said ring is a flat annular ring.

9. An assembly according to claim 2 or 1, in which said second preventing means comprises a bead on said wall adjacent to and surrounding said nozzle, against which bead said flat sheet is sealingly held by said annular sealing ring when said sealing ring is in its sealing position.

10. An assembly according to claim 1, in which said first preventing means includes a lip on the outer surface of said nozzle, said lip cooperating with said second preventing means and said annular sealing ring to hold said flat sheet between said sealing ring and said second preventing means when said sealing ring is in its sealing position.

11. An assembly according to claim 10, in which said second preventing means comprises a bead on said wall adjacent to and surrounding said nozzle.

12. An assembly according to claim 4, in which said sealing ring is held in place between said lip on said outer surface of said nozzle and said bead in an oblique position in relation to the outer surface of said nozzle.

13. An assembly according to claim 1 or 8, in which said duct, said nozzle and said wall are monolithically formed.

14. An assembly for sealingly connecting a duct to a hole in a flat sheet, comprising a wall extending generally in a plane for receiving one surface of said flat sheet; a nozzle adapted to be sealingly connected to said duct, said wall including a groove therein surrounding said nozzle, said nozzle being connected to said wall and mounted in a direction generally perpendicular to said plane so that the said flat sheet can be arranged with its said one surface in engagement with said wall and with the nozzle protruding through the hole in said flat sheet, and said nozzle including a lip on the outer surface of said nozzle; and an annular sealing ring snap-fitting about said nozzle, under said lip, and at least partially into said groove, so that said ring is engaged with the other surface of said flat sheet, said sealing ring cooperating with said wall and said lip to seal said flat sheet between said wall and said sealing ring.

15. An assembly according to claim 5, in which said groove includes a bead, which bead surrounds said nozzle and is disposed in the base of the groove, wherein said sealing ring cooperates with said bead and said lip to seal said flat sheet between said bead and said sealing ring.

* * * * *